US006364580B1

(12) United States Patent
Dils et al.

(10) Patent No.: US 6,364,580 B1
(45) Date of Patent: Apr. 2, 2002

(54) ACCESSORY TRAY FOR A HAND-HELD POWER TOOL

(75) Inventors: Jeffrey M. Dils, Chandler, AZ (US); John B. Womble, Greenville, SC (US); Daniel Alex Chunn, Tsuen Wan (HK)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 09/501,194

(22) Filed: Feb. 10, 2000

(51) Int. Cl.[7] .............................................. B23B 45/00

(52) U.S. Cl. ....................... 408/16; 408/16; 408/241 R; 16/110.5; 206/379; 81/49

(58) Field of Search ............................... 408/16, 241 R; 279/149; 81/490, 489; 211/69, 70.6; 206/379; 16/110.5, 111.1

(56) References Cited

U.S. PATENT DOCUMENTS

| | | | | | |
|---|---|---|---|---|---|
| 4,508,221 | A | * | 4/1985 | Olson | 206/379 |
| 4,564,322 | A | * | 1/1986 | Stapley | 408/16 |
| 4,797,040 | A | * | 1/1989 | Hibbard | 408/241 R |
| 4,932,294 | A | * | 6/1990 | Chang | 81/490 |
| 4,954,026 | A | | 9/1990 | Zurwelle | |
| 4,973,205 | A | | 11/1990 | Spaulding | |
| D331,356 | S | | 12/1992 | Amsberry | |
| 5,196,818 | A | | 3/1993 | Anderson | |
| 5,333,767 | A | | 8/1994 | Anderson | |
| 5,361,504 | A | * | 11/1994 | Huang | 33/371 |
| 5,405,004 | A | | 4/1995 | Vest et al. | |
| 5,445,479 | A | | 8/1995 | Hillinger | |
| D386,662 | S | | 11/1997 | Tozawa et al. | |
| 5,797,670 | A | | 8/1998 | Snoke et al. | |
| 5,810,525 | A | * | 9/1998 | Ector, Sr. | 408/241 R |
| D409,467 | S | | 5/1999 | Chung | |
| D411,947 | S | | 7/1999 | Sugimoto et al. | |
| 5,954,458 | A | * | 9/1999 | Lee | 408/16 |

FOREIGN PATENT DOCUMENTS

| | | | | |
|---|---|---|---|---|
| FR | 2491795 | * | 4/1982 | 408/16 |
| GB | 2 163 914 A | | 3/1986 | |

OTHER PUBLICATIONS

International Search Report—mailed Apr. 24, 2000.
Skil Power Tools Web Page illustrating Dual Source™ Drill.

* cited by examiner

*Primary Examiner*—Daniel W. Howell
*Assistant Examiner*—Terrence Washington
(74) *Attorney, Agent, or Firm*—Brooks & Kushman P.C.

(57) ABSTRACT

A hand-held power tool having a housing and an open top tray attached thereto is disclosed. The open top tray is oriented generally perpendicular to a handle axis for carrying small magnetic objects therein. Additionally, the tray is provided with a magnetic portion for retaining the small magnetic objects when the handle is inclined from a vertical position. Thus, the present invention allows small magnetic objects such as tool bits, drill bits, and fasteners to be carried on the hand-held power tool for quick and easy access by an operator.

26 Claims, 4 Drawing Sheets

Fig. 2
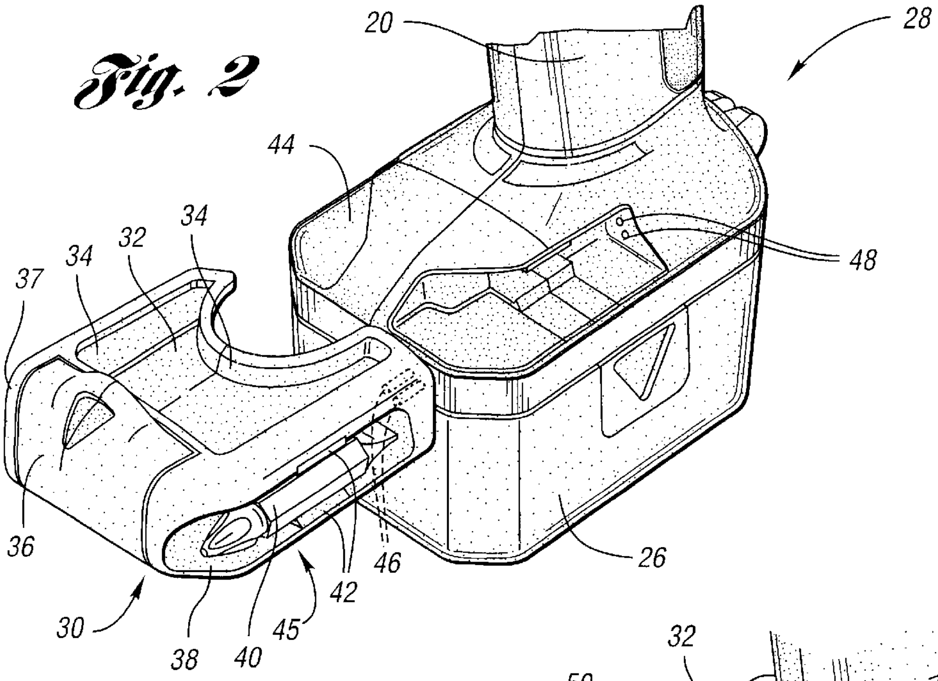
Fig. 3
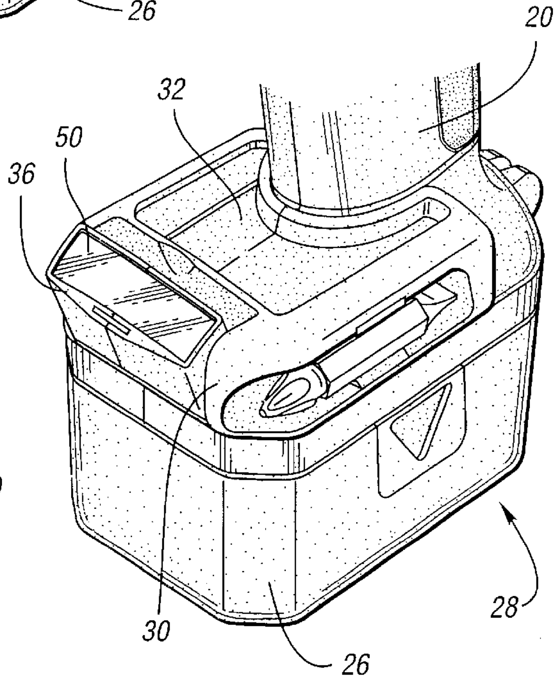
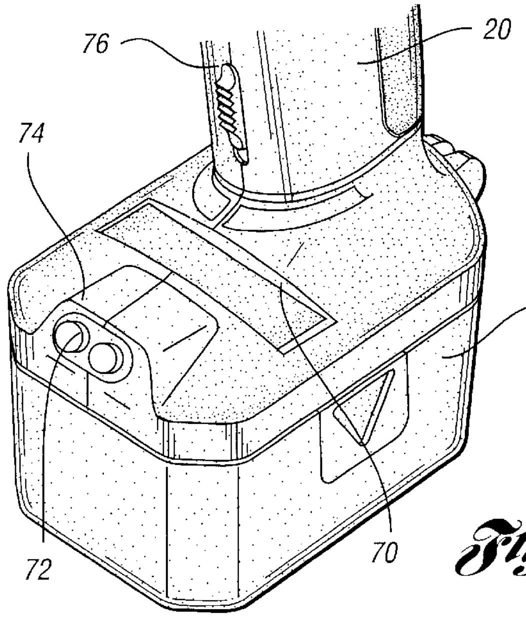
Fig. 4

ACCESSORY TRAY FOR A HAND-HELD POWER TOOL

TECHNICAL FIELD

The present invention relates to hand-held electric and cordless power tools having features for holding and carrying drill bits, tool bits, fasteners, and the like.

BACKGROUND ART

Corded as well as cordless hand-held drills are extensively used by electricians, plumbers, carpenters and others. Common tasks for such devices generally include drilling holes and driving fasteners such as screws. Such tasks require the use of drill bits and tool bits which are typically stored separately from the hand-held drill.

One problem confronting an operator using the hand-held drill is the need to locate a particular drill bit or tool bit to accomplish a given task. Since the tool bits or drill bits are typically stored in a separate location from the power drill an operator might be required to leave his workplace to search for the specific drill bit or tool bit required to complete the job. This inevitably leads to time delays and associated increased labor costs to complete a particular project. To address this problem the prior art has provided devices which are either integrated into or attachable to the hand-held drills which hold drill bits and tool bits alike.

However, another problem confronted by the operator using hand-held drills is the need to locate fastener devices such as screws for driving fasteners into a workpiece. Such fastening devices are also typically stored at a separate location from the power drill. Prior art solutions have been to provide carrying pouches and the like which can be worn around the operator's waist. While these pouches obviate the need for the operator to leave the workplace the operator must search a myriad of pockets to find the particular fastener required to complete the job. Thus, a significant time savings is not achieved by prior art devices.

Therefore, there exists a need for a device for removably fixing and carrying drill bits, tool bits and fasteners and which is readily accessible to an operator. Such a device must hold the tool bits, drill bits, and fasteners in an easily accessible and viewable manner.

DISCLOSURE OF INVENTION

Accordingly, an object of the present invention is to provide a hand-held power tool having a tray attached thereto for carrying small magnetic objects.

In accordance with this and other objects, the present invention provides a hand-held power tool having a housing and an open top tray attached to the housing. The housing includes a drive mechanism and motor provided with a rotary output shaft which is aligned along a tool axis. Further, a handle portion is aligned along a handle axis. The handle portion has a motor activator switch thereon for activating the motor and drive mechanism. The open top tray is oriented generally perpendicular to the handle axis for carrying small magnetic objects therein. Additionally, the tray is provided with a magnetic portion for retaining the small magnetic objects when the handle is inclined from a vertical position. Thus, the present invention allows small magnetic objects such as tool bits, drill bits, and fasteners to be carried on the hand-held power tool for quick and easy access by an operator.

In accordance with another aspect of the invention, a light is disposed on the handle portion for illuminating a work area.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is a perspective view of the power source end of a hand-held power tool having a detachable open top tray for carrying small magnetic objects, in accordance with the present invention;

FIG. 3 is a perspective view of the power source end of a hand-held power tool having a detachable open top tray for carrying small magnetic objects and a pivotal illumination device, in accordance with the present invention;

FIG. 4 is a perspective view of a hand-held power tool having an integrated open top tray for carrying small magnetic objects and an integrated illumination device for illuminating a work space, in accordance with the present invention.

BEST MODE FOR CARRYING OUT THE INVENTION

Figure 1:
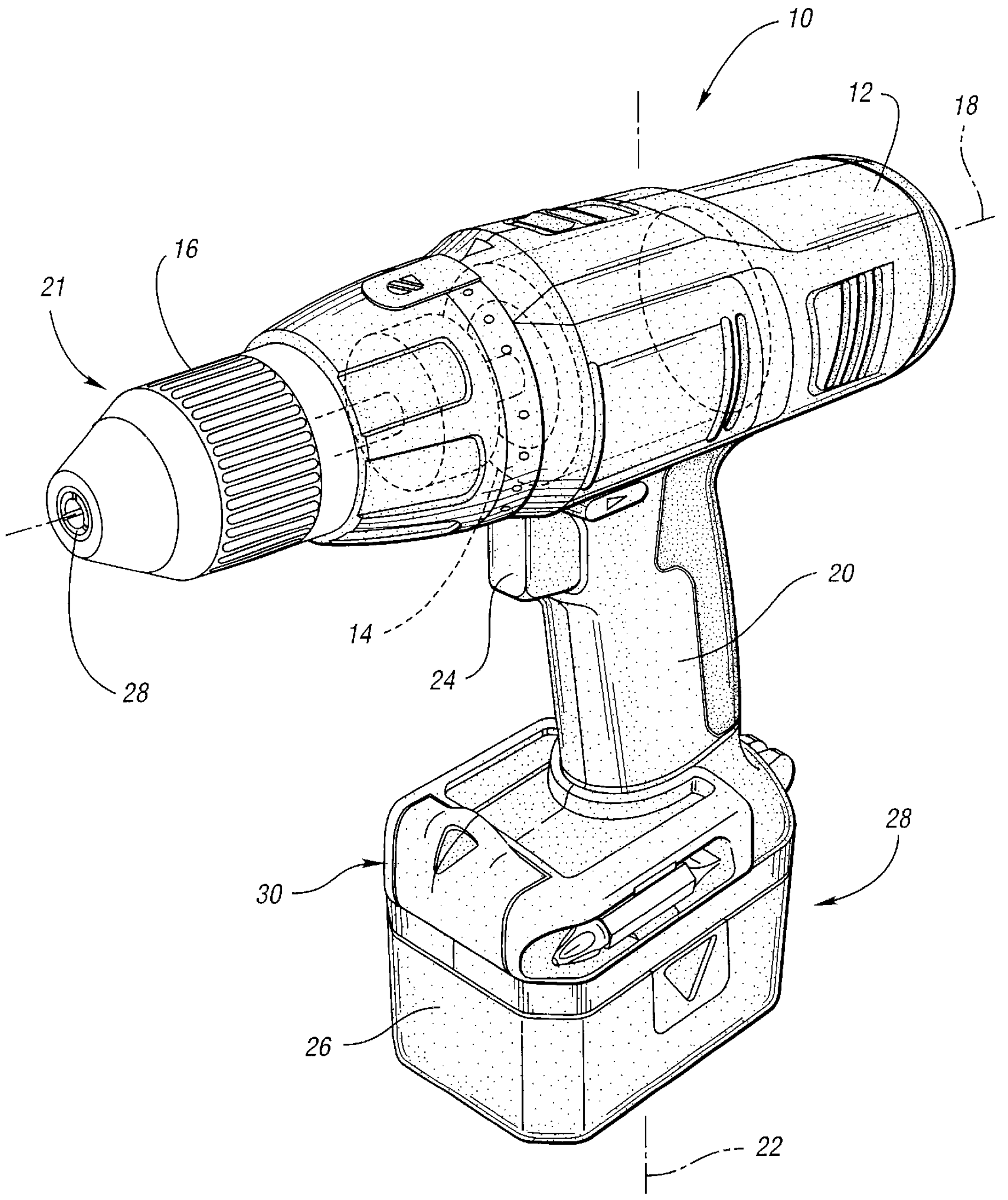
FIG. 1 is a perspective view of a hand-held power tool having an open top tray for carrying small magnetic objects, in accordance with the present invention.

Referring now to FIG. 1, an electric hand-held power drill 10 is shown. Power drill 10 has a housing 12 which accommodates a drive mechanism and motor 14 for driving a rotary output shaft 16. The drive mechanism, motor, and rotary output shaft are aligned along a tool axis 18. Housing 12 further includes a handle portion 20 for gripping the power tool 10, and directing a tool end 21 toward a workpiece. Handle portion 20 is aligned along a handle axis 22.

In operation a tool such as a tool bit, drill bit, or similar device is coupled to the rotary output shaft 16 for working on a workpiece. The tool is removably coupled to rotary output shaft 16 using a chuck 29, as conventionally known. Chuck 29 may be keyless or require a key (not shown) to open and close the chuck. Common tasks performed by the tool and hand-held power drill combination include, for example, forming holes and driving fasteners on and into the workpiece.

A motor activation switch 24 is disposed on the handle portion 20 for activating the drive mechanism and motor 14 to rotate the rotary output shaft. Preferably, a battery 26 is connected to the handle portion 20 at a power supply end 28 and provides electrical power to activate the drive mechanism and motor 14 for rotating the rotary output shaft 16. However, the present invention may be incorporated onto corded electric power drills (not shown) as well.

In accordance with the present invention, an accessory tray 30 is disposed at the power supply end 28 of the handle portion 20 for receiving small magnetic items, such as metallic fasteners, tool bits, drill bits, and the like. Tray 30 in one embodiment is removably fixed to the power supply end 28 and in another embodiment integrally molded with the power supply end 28 of housing 12. A detailed description of tray 30 will be provided hereinafter.

Reference is now made to FIG. 2, which is a perspective view of the power supply end 28 of housing 12 including battery 26 and tray 30, according to the present invention. Tray 30 is shown removed from power supply end 28. Tray 30 includes a tray bottom 32 which is surrounded by upright side walls 34 which define a cavity. In a preferred embodiment, tray bottom 32 has a magnetic surface for attracting magnetic objects. Preferably, the tray bottom 32 is lined by a thin flexible magnet sheet of the type commonly used for refrigerator magnets. Alternatively, one or more smaller magnet elements can be mounted within or underneath the tray. Accordingly, when metallic fasteners and other ferrous materials are placed within tray 30, the tray bottom 32 attracts and retains the small devices adjacent thereto. Moreover, tray 30 is oriented, generally, perpendicular to handle axis 22 to allow gravitational forces to operate on the small devices and objects to facilitate carrying the objects within the tray.

Tray 30 further comprises a light housing 36 which in this preferred embodiment is pivotably attached to a forward end 37 of tray 30. Tray 30 also provides a recess 38 for receiving a tool bit 40 or the like which is captured in recess 38 by a detent formed by two opposing spring protrusions 42. Preferably, an identical recess 38 is disposed on the opposite side of tray 30 having a detent formed by spring protrusions 42 for holding another tool bit 40 securely in place.

Power supply end 28 has a pair of slots 44 configured to removably fix tray 30 to housing 12. Tray 30 has an underside 45 formed to fit slots 44 for removable engagement thereto. Further, a pair of electrical contacts 46 having opposite electrical polarity derived from an electrical connection with battery 26 provides a power source to a light bulb contained within the light housing 36. Electrical contacts 46 communicate electric power to operate the light bulb by uniting with a pair of mating contacts 48 which are disposed within slots 44 and which are in electrical communication with the light bulb within the light housing 36.

Reference is now made to FIG. 3, which shows tray 30 in a removably attached position relative to power supply end 28. As shown, light housing 36 may be rotated counterclockwise to expose a lens 50 which covers a light source, such as a lightbulb (not shown) for illuminating a work space. When the light is rotated to a closed position, as shown in FIG. 2, by rotating housing 36 clockwise electrical power is interrupted to the light bulb. The pivotal attachment arrangement of light housing 36 to housing 12 allows light to be directed at a preferred angle depending on the present working environment.

Referring now to FIG. 4, another embodiment of the present invention having an integrated tray 70 and fixed light housing 72 is illustrated, according to the present invention. Integrally molded accessory tray 70 is disposed along a top surface of the power supply end 28 for capturing small metallic items such as screws, tool bits, drill bits, etc. therein. The integrated tray 70 includes a magnetic material disposed along a bottom surface 78 of integrated tray 70. A surrounding side wall attached to the bottom surface 78 and extending upward therefrom defines a recess for carrying the small metallic items. A depth of tray 70 may be increased to create a tray having a larger carrying capacity.

Light housing 72 is shown integrally molded with power supply end 28 and may contain two light bulbs as shown. A plastic lens cover 74 is also provided to disperse the light for increased visibility of a work space. Light bulbs are activated and deactivated by a light switch 76 slidably fixed to housing 12. Preferably, a three position switch is used having an off, one light on, and both lights on positions.

Figure 5:
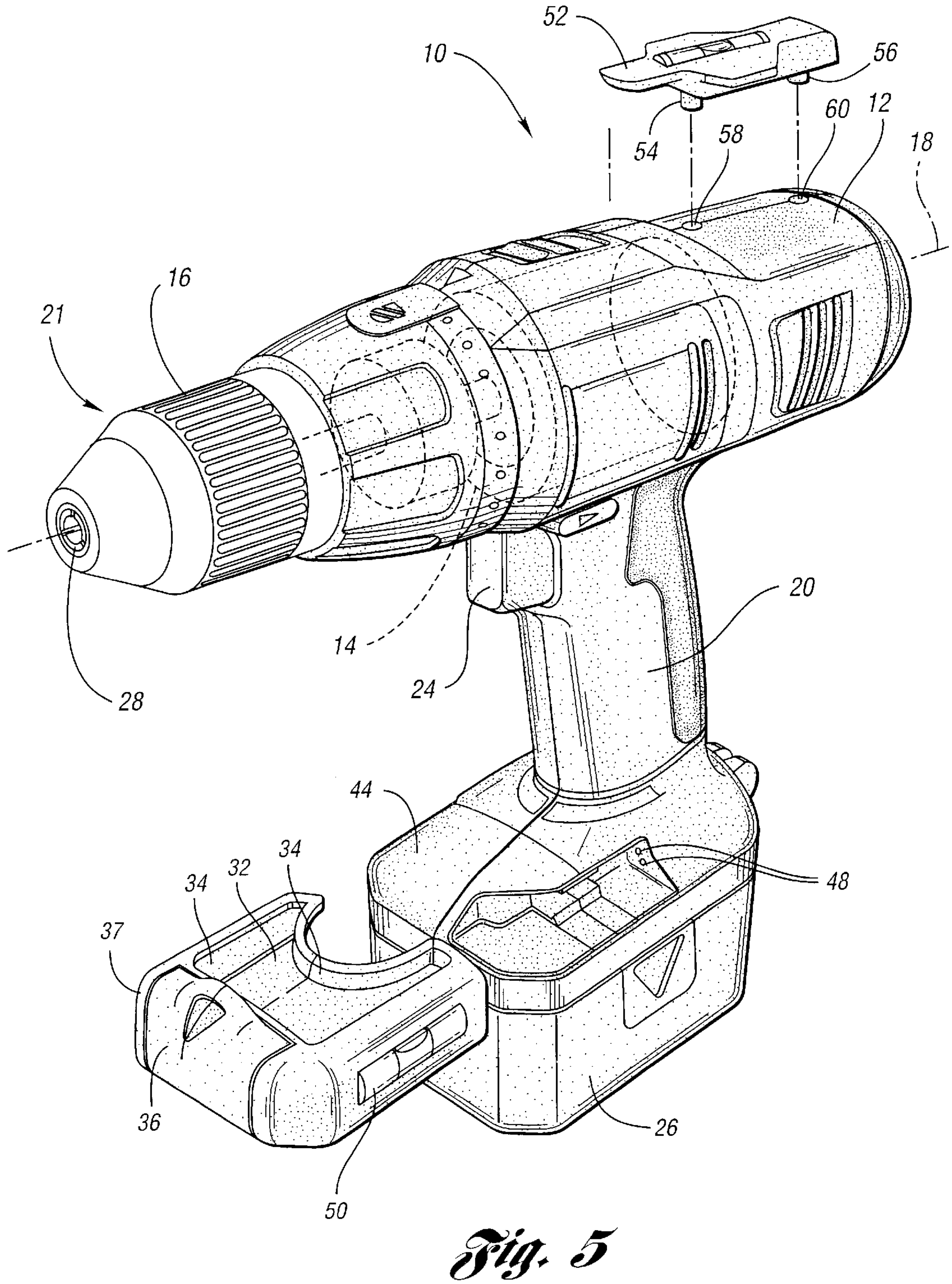
FIG. 5 is a perspective view of a hand-held power tool having a detachable open top tray wherein the open top tray comprises a level, in accordance with the present invention.

Referring now to FIG. 5, an alternative embodiment of hand-held power drill 10 is illustrated, in accordance with the present invention. Accessory tray 30 is provided with a bubble level 50 for determining the relative inclination of the hand-held power drill 10 with respect to the ground. Level 50 is fixed to accessory tray 30, and is viewable over a wide viewing angle. For example, if the operator is holding the drill above his or her head the level is viewable to determine the inclination of the drill. Similarly, if the operator's head is positioned above the drill the level is still viewable for determining inclination of the drill. A similar level 50 may be disposed on an opposite side of accessory tray 30, and affixed to accessory tray 30 in the same manner as shown. Thus, the present intention aids the operator to orient the tool axis of the drill parallel with the ground.

Additionally, hand-held power drill 10 is configured to receive a detachable level 52. Detachable level 52 is fixed to a level housing 53 which has a pair of flexible tangs 54 and 56 and is removably fixed to housing 12 by receiving flexible tangs 54 and 56 into apertures 58 and 60 which are formed in housing 12. Other attachment schemes, known to individuals of ordinary skill in the art, which allow detachable level 52 to be removably fixed to housing 12 may also be used. Once the level housing 53 is fixed to housing 12 an operator may use level 52 to determine a relative inclination of the hand-held drill 10 with respect to the ground and reorient the tool axis 18 if needed. Furthermore, the level housing 53 has a generally flat elongated bottom 55 which is parallel with detachable level 52. The flat elongated bottom 55 allows the level housing 53 to be placed on a workpiece or the like to provide the operator with a relative orientation of the workpiece with respect to the ground.

Figure 6:
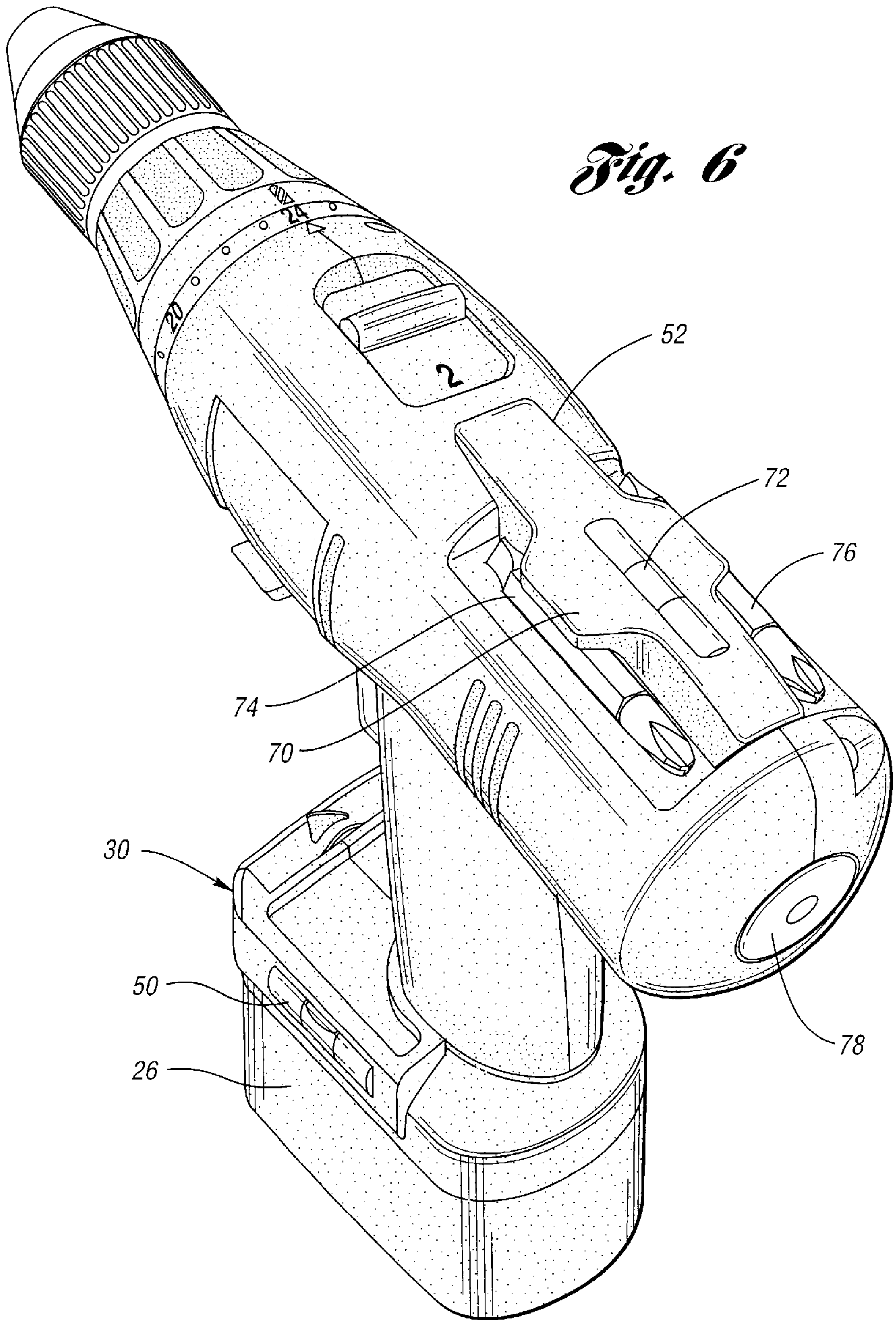
FIG. 6 is a perspective view of hand-held power tool having a detachable level shown in an attached position with respect to the housing, in accordance with the present invention.

In FIG. 6, detachable level 52 is shown attached to housing 12. The detachable level 52 includes a pair of overhanging flanges 70, 72 which form a detent for receiving and holding tool bits 74 and 76. Additionally, a bullseye bubble level 78 is disposed at a rear end of housing 12. Bullseye bubble level 78 allows an operator to orient the tool axis vertically with respect to the ground. The present invention provides a means to ensure that the tool axis is vertical when required.

Thus, the present invention has many advantages and benefits over the prior art. For example, present invention provides a means for carrying small metallic objects on an electric power tool. This allows easy and quick access to metallic items such as tool bits, drill bits, and fasteners. Accordingly a time savings and reduced project cost may be realized through the use of the present invention. Moreover, the present invention offers a convenient receptacle to deposit fasteners obtained from the disassembly of a workpiece. Typically, upon disassembling a workpiece fasteners can be easily misplaced, therefore a device such as the present invention reduces the risk of losing fasteners while reducing the time needed to reassemble a workpiece.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hand-held power tool, comprising:

a housing including a drive mechanism and motor provided with a rotary output shaft aligned along a tool axis and a handle portion aligned along a handle axis, the handle portion having a motor activator switch mounted thereon; and an open top tray oriented generally perpendicular to the handle axis for carrying small magnetic objects therein, wherein the tray is provided with a magnetic portion for retaining the small magnetic objects placed within the tray when the handle is inclined from a vertical position.

2. The hand-held power tool of claim 1, wherein the open top tray has at least one exterior side wall having at least one recess, the at least one recess including a detent for releasibly retaining a bit therein.

3. The hand-held power tool of claim 1, wherein the open top tray is defined by a surrounding sidewall and a tray bottom which are integrally molded with the housing.

4. The hand-held power tool of claim 1, wherein the open top tray is configured to be removable from the housing by providing a housing with at least one slot formed therein for releasibly affixing the tray to the housing.

5. The hand-held power tool of claim 4, wherein the at least one slot is configured to releasibly engage a tool or drill bit when the tray is not received in the slot.

6. The hand-held power tool of claim 1, further comprising a light attached to the tray for illuminating an area forward of the power tool.

7. The hand-held power tool of claim 6, wherein the housing further comprises a housing electrical contact for communicating electrical energy from a power source to the light.

8. The hand-held power tool of claim 6, wherein the light is pivotally mounted to the tray for directing illumination forward of the power tool.

9. The hand-held power tool of claim 8, wherein electrical energy for energizing the light is interrupted when the light is pivoted between an active open position and an inactive closed position.

10. The hand-held power tool of claim 9, wherein the tray further comprises a tray electrical contact configured to mate with the housing electrical contact for communicating electrical energy from a power source to the light.

11. The hand-held power tool of claim 1, wherein the hand-held power tool is a portable electric power drill, having a chuck coupled to the rotary output shaft for releasibly fixing a bit thereto, whereby the bit is used to operate on a workpiece, and a battery attached to the housing and in electrical communication with the motor for providing electrical power to drive the motor.

12. The hand-held power tool of claim 1, further comprising a level attached to the tray for aiding in orienting the hand-held power tool with respect to a ground surface.

13. The hand-held power tool of claim 1, further comprising a detachable level removably fixed to the housing for determining a relative orientation of the hand-held power tool with respect to a ground surface.

14. A portable electric power drill, comprising:

a housing including a drive mechanism and motor provided with a rotary output shaft aligned along a tool axis and a handle portion aligned along a handle axis, the handle portion having a motor activator switch mounted thereon;

a chuck coupled to the rotary output shaft for releasibly fixing a bit thereto, wherein the bit is used to operate on a workpiece;

a battery attached to the housing and in electrical communication with the motor for providing electrical power to drive the motor; and an open top tray oriented generally perpendicular to the handle axis for carrying small magnetic objects therein, wherein the tray is provided with a magnetic portion for retaining the small magnetic objects placed within the tray when the handle is inclined from a vertical position.

15. The portable electric power drill of claim 14, wherein the open top tray is defined by a surrounding sidewall and a tray bottom which are integrally molded with the housing.

16. The portable electric power drill of claim 14, wherein the open top tray is configured to be removable from the housing by providing a housing with at least one slot formed therein for releasibly affixing the tray to the housing.

17. The portable electric power drill of claim 14, wherein the open top tray has at least one exterior side wall having at least one recess, the at least one recess including a detent for releasibly retaining a bit therein.

18. The portable electric power drill of claim 14, wherein the housing is provided with at least one slot formed therein for removably receiving and affixing the tray to the housing.

19. The portable electric power drill of claim 18, wherein the at least one slot is configured to releasibly engage a bit when the tray is not received in the slot.

20. The portable electric power drill of claim 14, further comprising a light attached to the tray for illuminating an area forward of the power tool.

21. The portable electric power drill of claim 20, wherein the housing further comprises a housing electrical contact for communicating electrical energy from a power source to the light.

22. The portable electric power drill of claim 21, wherein the tray further comprises a tray electrical contact configured to mate with the housing electrical contact for communicating electrical energy from a power source to the light.

23. The portable electric power drill of claim 21, wherein the light is pivotally mounted to the tray for directing illumination forward of the power tool.

24. The portable electric power drill of claim 23, wherein electrical energy for energizing the light is interrupted when the light is pivoted between an active open position and an inactive closed position.

25. The portable electrical power drill of claim 14, further comprising a level attached to the tray for aiding in orienting the drill with respect to a ground surface.

26. The portable electric power drill of claim 14, further comprising a detachable level removably fixed to the housing for determining a relative orientation of the drill with respect to a ground surface.

* * * * *